United States Patent [19]

Yanagawa

[11] 3,785,486

[45] Jan. 15, 1974

[54] INFORMATION CARD RETRIEVAL APPARATUS

[75] Inventor: Nobuyuki Yanagawa, Kanagawa, Japan

[73] Assignee: Ricoh Co., Ltd., Tokyo, Japan

[22] Filed: Mar. 8, 1973

[21] Appl. No.: 339,437

[30] Foreign Application Priority Data

Mar. 31, 1972 Japan .............................. 47/31602

[52] U.S. Cl. .............................. 209/80.5, 209/111.8
[51] Int. Cl. .............................. B65h 25/24
[58] Field of Search .............................. 209/80.5, 110.5, 209/111.8

[56] References Cited

UNITED STATES PATENTS

| | | | |
|---|---|---|---|
| 3,631,978 | 1/1972 | Hagan | 209/80.5 |
| 3,670,885 | 6/1972 | Harlow | 209/80.5 |

*Primary Examiner*—Richard A. Schacher
*Attorney*—Henry T. Burke et al.

[57] ABSTRACT

Apparatus for retrieving a selected one from a stack of information cards and for automatically returning the retrieved card to the stack, wherein each of the cards has a code edge with a magnetically permeable portion and a portion bearing code grooves. The apparatus includes means for advancing the stack of cards along a first path, a rotary magnet adjacent the first path for urging successive advancing cards out of the first path and into a second path by attracting the magnetically permeable portions of the cards, and a plurality of pivoted members individually movable to positions for engaging the code edges of the advancing cards in register with the grooves of a selected card, so as to permit only the selected card to be diverted by the magnet into the second path while directing other cards along the first path away from the magnet. A set of reversibly driven rollers advances a diverted card along the second path to a withdrawn position, and returns the card back into the stack of cards in the first path, depending on the direction of drive of the rollers. A member movable into and out of the second path separates a returning card from the magnet as the card moves toward the first path. Fixed guides engage lugs projecting from the cards to cooperate with the magnet, pivoted members, and rollers in guiding each successive card in the appropriate direction.

4 Claims, 6 Drawing Figures

INFORMATION CARD RETRIEVAL APPARATUS

BACKGROUND OF THE INVENTION

This invention relates to an information card retrieval apparatus.

Many different types of apparatus have hitherto been in use for retrieving desired information cards, such for example as aperture cards or punched cards, from a collection of information cards haphazardly filed, but individually coded so that the desired information cards can be located and withdrawn from the file case according to some predetermined identifying system. Any information card located in this way is processed by various machines after being retrieved, but it has hitherto been customary manually to return the card to the case after the card is used. Thus, the only requirement which has to be met by information card retrieval apparatus of the prior art has been that selection and withdrawal of the desired information cards is performed positively. However, in an automatic selection microreader, it is necessary for simplifying operation and increasing operational efficiency that any desired information card be quickly and accurately retrieved and also that the card be automatically returned to the file case after being used.

SUMMARY OF THE INVENTION

This invention has as its object the provision of a novel apparatus for retrieving any desired information card, particularly an information card or a microfiche used with an automatic selection microreader. A specific object of the invention is to provide a card-retrieving apparatus affording automatic return of a retrieved card to a stack of the cards.

As aforementioned, this invention is directed to the provision of an automatic information card retrieval apparatus which is capable of automatically not only retrieving but also returning information cards. According to the invention, this object is accomplished by providing a magnetic locating or selecting section and a withdrawal section capable of moving cards in both normal and reverse directions as subsequently to be described in detail with reference to an embodiment.

In a specific sense, the invention contemplates the provision of an information card retrieval apparatus broadly comprising a tray supporting thereon for vertical movement of a magazine containing therein a number of information cards disposed substantially horizontally one on another, selection means disposed along the plane of movement of code edges of said information cards in said magazine, and withdrawal means for withdrawing any selected information card to a predetermined position. In accordance with the invention the selection means comprises a permanent magnet for attracting a magnetically permeable portion of the code edge of each of the information cards, and a plurality of selectors arranged in positions corresponding to code grooves formed in the code edge of each of the information cards and pivotal between an ON position and an OFF position, the plurality of selectors acting to release an information card from engagement with the permanent magnet at the ON position when they are not in register with the code grooves of the card. The withdrawal means includes return means and comprises a plurality of separators disposed in positions in which lugs of each information card pass, a plurality of feed rollers adapted to rotate in both normal and reverse directions for withdrawing a selected information card to a withdrawn position, and a pivotal pick-off bar mounted near the permanent magnet for releasing the information card from engagement with the permanent magnet. The plurality of separators are each formed with a take-out passage for permitting the selected information card to move therethrough on its way to the withdrawn position, a transit passage for permitting the information card to move therethrough without leading the same to the withdrawn position, and a return passage for permitting the information card returned by the feed rollers rotating in the reverse direction to move therethrough and moving the same toward the magazine.

Other and additional objects as well as features and advantages of the invention will become evident from the description set forth hereinafter when considered in conjunction with the accompanying drawings.

DETAILED DESCRIPTION

Figure 1:
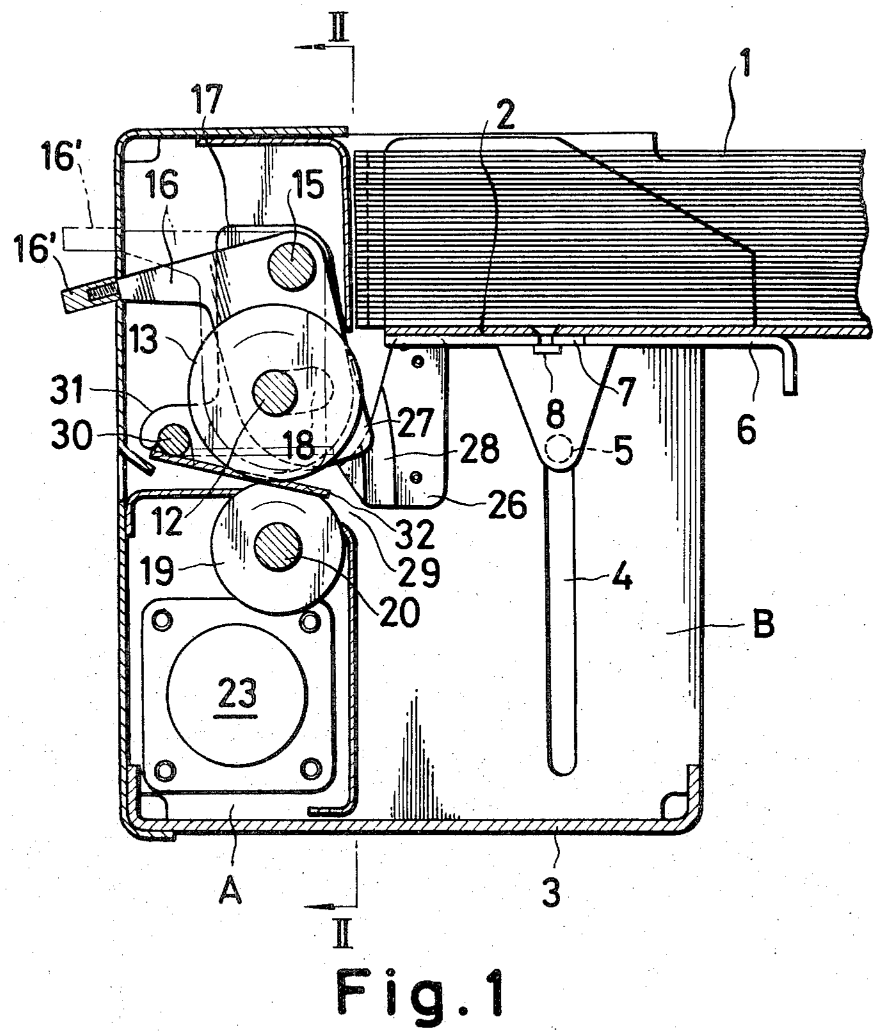
FIG. 1 is a vertical sectional view of the information card retrieval apparatus comprising one embodiment of this invention.
Figure 2:
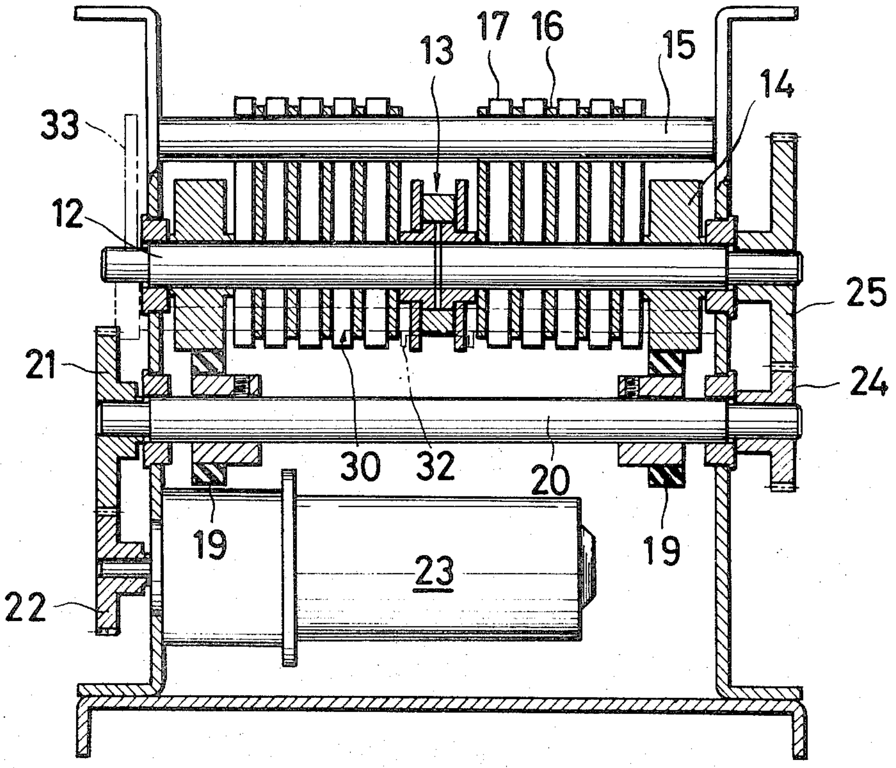
FIG. 2 is a sectional view taken along the line II—II of FIG. 1.

In FIG. 1 and FIG. 2, there is shown a casing 3 for a microreader which casing comprises a chamber A for housing therein an information card retrieval apparatus and a chamber B in which a case or a magazine 2 containing therein a number of information cards 1 is moved vertically in FIG. 1 for selecting and withdrawing any desired information card from the magazine 2.

A tray 6 for supporting the magazine 2 in which the information cards are stored substantially in horizontal position is guided in its vertical movement by a guide rod 5 adapted to move in a pair of vertical grooves 4 formed in the chamber B. The tray 6 is formed therein with a gourd-shaped opening 7 including a larger diameter section and a smaller diameter section for securing the magazine 2 in place on the tray 6 and facilitating removal of the magazine 2 from the tray 6. For securing the magazine 2 to the tray 6, the magazine 2 may be studded with a stepped pin 8 having a portion corresponding in size to the smaller diameter section of the gourd-shaped opening 7 and a head larger than the smaller diameter section but smaller than the larger diameter section of the gourd-shaped opening 7 in size. It is to be understood that means for securing the magazine to the tray 6 is not limited to the pin 8 and that any other suitable means may be used.

Figure 3:
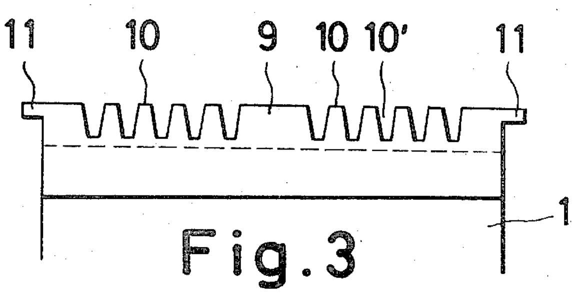
FIG. 3 is a fragmentary plan view of an information card adapted for use with the apparatus according to the invention.

The information cards 1, each having at one edge a magnetically permeable portion 9, magnetically non-permeable code portions 10 and lugs 11 as shown in FIG. 3, are placed in positions one overlying another and stored in the magazine 2. The code edge having the portions 9 and 10 and lugs 11 of each information card 1 faces the side of the chamber B which faces the information card retrieval apparatus.

A shaft 12 disposed parallel to the aforementioned edges of the information cards 1 is rotatably supported by the chamber B. As shown in FIG. 2, a permanent magnet 13 is secured to the substantially central portion of the shaft 12 which is disposed in a position corresponding to the magnetically permeable portion 9 of one of the information cards 1. A pair of idle rollers 14 are each mounted at one of opposite ends of the shaft 12 and disposed inside the casing 3 for free rotation.

On a fixed shaft disposed parallel to the shaft 12, a plurality of selectors 16 corresponding in number to the code grooves formed in each information card are supported for pivotal motion. A partition plate 17 is arranged between the adjacent selectors 16.

The selectors 16 have the spacings between them adjusted by the partition plates 17 so that the selectors may be positively indexed with the corresponding code grooves of each information card 1.

The partition plates 17 are held by the shafts 12 and 15 against pivotal movement while the selectors 16 are held for pivotal movement about the sahft 15. A slot 18 is formed in each selector 16 for receiving the shaft 12 therein so that the selectors 16 may be able to pivot without being interfered with by the shaft 12.

A pair of feed rollers 19 made of rubber or other resilient material which are secured to a drive shaft 20 are maintained in contact with the idle rollers 14. The drive shaft 20 is operated through gears 21 and 22 from an electric motor 23. The drive shaft 20 is drivingly connected to the shaft 12 through gear 24 and 25. The size of the gears is set such that the feed rollers 19 rotate at a higher peripheral velocity than the permanent magnet 13 which rotates as the shaft 12 rotates.

A plurality of separators 26 are each secured to one of opposite sides of the chamber 2 and disposed inside the chamber in positions where the lugs 11 of each information card 1 pass in their movement. Each separator 26 is formed in the shape of a cam having surfaces constituting a take-out guide passage 27, a transit passage 28 and a return passage 29. The separators 26 cooperate with the selectors 16 for selecting the passage for each information card to pass through.

Any of the selectors 16 can be moved either manually by using a lever 16' connected thereto as shown in FIG. 1 or by any known mechanical means between an OFF position shown in dash-and-dot lines and an ON position shown in solid lines in FIG. 1.

A pick-off bar 32 is mounted in gaps on opposite sides of the magnet 13 for finally releasing the magnetically permeable portion of each information card from engagement with the permanent magnet 13 when the card is returned. The pick-off bars 32 are secured to a rod 30 rotatably supported by the casing 3. An operation lever is connected to the rod 30.

When any information card is withdrawn, the lever 33 is actuated either manually or through cooperation with means for controlling selection and withdrawal of information cards to cause the pick-off bar 32 to pivot upwardly in FIG. 1 to dash-and-dot line positions so as not to interfere with the movement of the card about the shaft. When the card is returned, the pick-off bar is disposed in its lower (solid line) position.

A hook 31 formed in each partition plate 17 engages the rod 30, so that the partition plates can be positively positioned.

In operation, the electric motor 23 is rotated in the normal direction, the magazine 2 containing the information cards 1 therein is mounted on the tray 6, and predetermined selectors 16 are moved to the ON positions in accordance with a predetermined identifying system. At this time, the pick-off bar 32 is held in the upper position.

Then, the tray 6 is moved downwardly either manually or mechanically with the code bearing edges of the information cards being positioned to face the chamber A.

Figures 4, 5, 6:
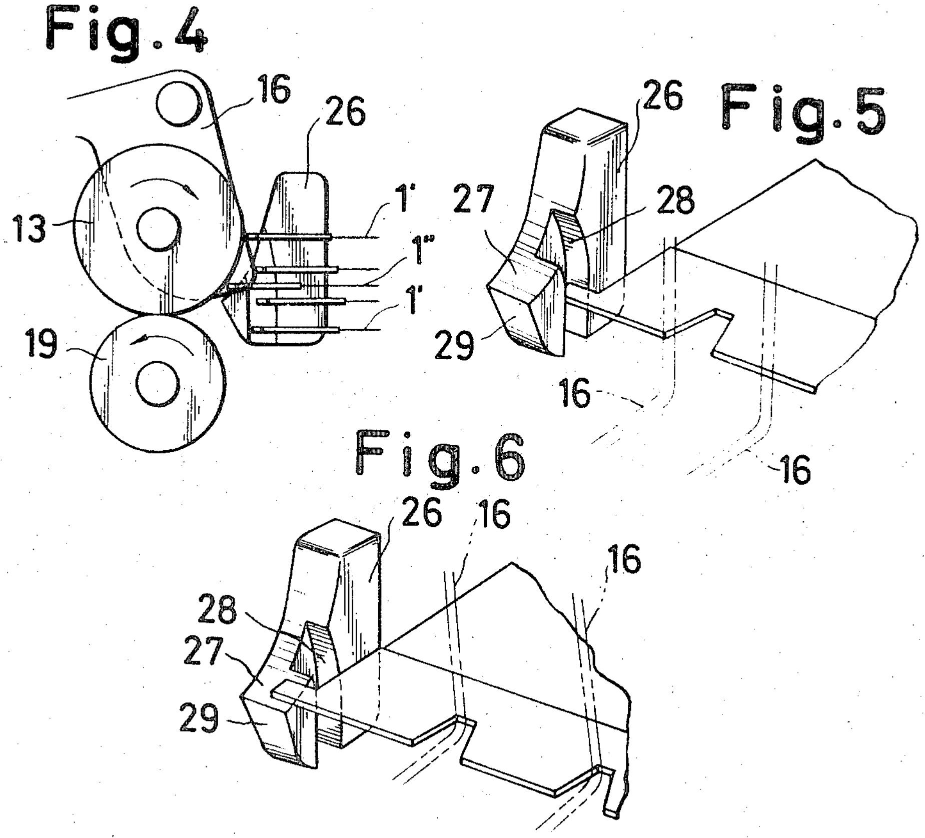
FIG. 4 shows the manner in which a desired information card is selected.
FIG. 5 and FIG. 6 are perspective views showing the relation between the card and one of the separators.

When one of the information cards 1 is indexed with the selection position, the magnetically permeable portion 9 of the particular information card is attracted to the permanent magnet 13. If none of the selectors 16 in the ON position agree with code grooves 10' of the information card 1, then the card moves along the surfaces of the selector in a position in which it is moved away from the permanent magnet 13. At this time, each lug 11 of the card 1 is guided to move through the transit passage 28 of one of the separators 26 as is a card 1' shown in FIG. 4 or as shown in FIG. 5. When moved further downwardly, the card is held in a position in which it is returned to the magazine 2.

If the code grooves 10' of any card 1 agree with all the selectors 16 in the ON position, then each lug 11 of the particular card is moved through the take-out passage 27 of one of the separators 26 as is a card 1'' shown in FIG. 4 or as shown in FIG. 6 while being attracted to the permanent magnet 13 which rotates, without the movement of the card being interfered with by the selectors 16.

The information card 1 whose lugs 11 move through the take-out passages 27 of the separators 26 is moved downwardly till it reaches the same level as the feed rollers 19 where it is held between the feed rollers 19 and the idle rollers 14 and quickly pulled out to a predetermined position.

When the desired information card cannot be found by selecting it from among the cards as aforementioned, the magazine is removed from the tray 6 which is moved upwardly and another magazine is mounted thereon to repeat the aforementioned selection process.

When the desired information card is withdrawn to the predetermined position, the magazine 2 remains stationary by being held at its lower end. Upon completion of read-out of the information card 1 in the withdrawn position, the pick-off bars 32 are returned to the lower solid line positions or return positions and the electric motor 23 is rotated in the reverse direction to return the information card to its original position. The card is released from engagement with the permanent magnet 13 by the pick-off bars 32 and moved downwardly with its lugs 11 moving through the return passages 29 of the separators 26 till the card is returned to the magazine 2 which is stationary by being held at its lower end.

According to the invention, any desired information card can be selected from among a number of information cards contained in a magazine and disposed substantially horizontally one on another by means of the code grooves 10' formed in the code portion 10 of the code edge of each information card cooperating with the permanent magnet and the selectors. The lugs of the desired information card only are moved through the take-out passages while the lugs of the rest of the information cards are moved through other passages, and the desired card located in this way is moved by the separators to a predetermined position whence it is positively withdrawn by means of the reversible feed rollers. By rotating the feed rollers in the reverse direction, the withdrawn information card can be returned to the magazine with its lugs moving through the return passages of the separators after having the information thereon read out.

From the foregoing description, it will be appreciated that the invention permits any desired information card to be selected and withdrawn readily and positively.

It is to be understood that the invention is not limited to the features and embodiments hereinabove specifically set forth, but may be carried out in other ways without departure from its spirit.

What is claimed is:

1. An information card retrieval apparatus comprising a. A magazine for containing a number of information cards disposed substantially horizontally one on another, each of the cards having a code edge with a magnetically permeable portion, lugs, and at least one code groove formed in the code edge;

b. A tray supporting said magazine for vertical movement with the code edges of the cards moving in a plane;

c. means, disposed along said last-mentioned plane, for selecting a card from said magazine, said selecting means comprising i. a permanent magnet for attracting the magnetically permeable portion on the code edge of each of said information cards, and ii. a plurality of selectors arranged in positions corresponding to code grooves formed in the code edge of each of said information cards and pivotally movable between an ON position and an OFF position, said plurality of selectors acting to release an information card from engagement with the permanent magnet at the ON position when they do not register with the code grooves of the card; and d. Withdrawal means for withdrawing any selected information card to a predetermined position, said withdrawal means including means for returning a withdrawn card to the magazine, and comprising i. a plurality of feed rollers adapted to rotate in both normal and reverse directions for withdrawing a selected information card to a withdrawn position, ii. a pivotal pick-off bar mounted near said permanent magnet for releasing an information card from engagement with the permanent magnet, and iii. a plurality of separators disposed in positions in which lugs of each information card pass, said plurality of separators each being formed with a take-out passage for permitting a selected information card to move therethrough on its way to the withdrawn position, a transit passage for permitting an information card to move therethrough without leading the same to the withdrawn position, and a return passage for permitting an information card returned by the feed rollers rotating in the reverse direction to move therethrough and moving the same toward the magazine.

2. group apparatus for retrieving a selected information card from a gourp of such cards each having a code edge including a magnetically permeable portion and at least one code groove at a selected one of a plurality of code groove positions, the combination of a. means for advancing a stack of the cards along a first path with the code edges moving in a common plane;

b. means for selecting a card from a stack thereof advancing along said first path, said selecting means comprising i. a magnet disposed adjacent said plane for magnetically attracting the permeable portion of each card advancing past said magnet in said first path, to urge said card into a second path transverse to said first path, and ii. a plurality of members respectively disposed for register with the code groove positions of cards advancing in said first path, each of said members being individually movable into and out of a position for selectively restraining cards lacking a groove in register therewith against movement into said second path by said magnet, such that movement of selected ones of said members into the last-mentioned position permits selective diversion by said magnet, into said second path, of a card having grooves corresponding to the selected members while preventing diversion of all other cards advancing in said first path; and c. means for moving a selected card out of and into said first path, comprising i. reversibly drivable roller means for advancing a card diverted into said second path to a withdrawal locality external to said first path, and for returning a card from said locality along said second path to a stack of cards in said first path, depending on the direction of drive of said roller means, and ii. means movable into and out of a position in said second path for separating a card, returning in said second path to said first path, from said magnet.

3. Apparatus as defined in claim 2, for use with cards having opposed lugs respectively projecting from opposite sides thereof, said apparatus further including a pair of guides respectively disposed to engage the opposed lugs of a card advancing into proximity with said magnet in said first path, each of said guides having a first surface for cooperating with said magnet for guiding the lugs of a card from said first path to said second path, a track for cooperating with said members for guiding the lugs of a card restrained by said members along said first path away from said second path, and a second surface for guiding the lugs of a card returning in said second path back into said first path.

4. Apparatus as defined in claim 3, including means for rotating said magnet; wherein each of said members is pivotable between an inoperative position and a position for engaging the code edge of a card lacking a groove in register therewith to urge the last-mentioned card away from said magnet and along said track; and wherein said separating means comprises a member angularly displaceable into and out of said second path.

* * * * *